United States Patent [19]
Park

[11] Patent Number: 6,079,016
[45] Date of Patent: Jun. 20, 2000

[54] COMPUTER WITH MULTI BOOTING FUNCTION

[75] Inventor: Jee-Kyoung Park, Seoul, Rep. of Korea

[73] Assignee: SamSung Electronics Co., Ltd., Kyungki-do, Rep. of Korea

[21] Appl. No.: 08/852,874

[22] Filed: May 7, 1997

[30] Foreign Application Priority Data

May 7, 1996 [KR] Rep. of Korea ........................ 96-14793

[51] Int. Cl.[7] .................................................. G06F 9/445
[52] U.S. Cl. .................................. 713/2; 710/10; 714/36
[58] Field of Search .................................... 713/1, 2, 100; 709/221, 222, 220; 710/61, 129, 127, 10; 395/375, 575; 364/900; 712/15, 220; 714/10, 36

[56] References Cited

U.S. PATENT DOCUMENTS

| | | | |
|---|---|---|---|
| 4,631,701 | 12/1986 | Kappeler et al. ........................ | 364/900 |
| 4,649,505 | 3/1987 | Zinser, Jr. et al. ....................... | 379/411 |
| 4,720,812 | 1/1988 | Kao et al. ................................ | 364/900 |
| 5,319,574 | 6/1994 | Ikeda .................................. | 364/551.01 |
| 5,333,273 | 7/1994 | Raasch et al. ............................. | 710/61 |
| 5,388,267 | 2/1995 | Chan et al. . | |
| 5,408,624 | 4/1995 | Raasch et al. ........................... | 395/375 |
| 5,432,927 | 7/1995 | Grote et al. . | |
| 5,463,766 | 10/1995 | Schieve et al. . | |
| 5,551,045 | 8/1996 | Kawamoto et al. ..................... | 395/775 |
| 5,564,054 | 10/1996 | Bramnick et al. . | |
| 5,699,546 | 12/1997 | Nishikata et al. ....................... | 395/430 |
| 5,701,492 | 12/1997 | Wadsworth et al. .................... | 395/712 |
| 5,784,611 | 7/1998 | Thantrakul ................................... | 713/1 |
| 5,822,581 | 10/1998 | Christeson .................................. | 713/1 |
| 5,884,055 | 3/1999 | Tung et al. .............................. | 710/127 |
| 5,960,445 | 9/1999 | Tamori et al. ........................... | 707/203 |

*Primary Examiner*—Joseph E. Palys
*Assistant Examiner*—RiJue Mai
*Attorney, Agent, or Firm*—Robert E. Bushnell, Esq.

[57] ABSTRACT

A computer having multi booting function with more than two boot-ROMs is disclosed. The boot-ROMs comprise a flash RAM, and have the same address space in the computer system. Preferably, the first boot-ROM is provided with a general boot program, and the second boot-ROM with detailed diagnostic program. Alternatively, the first boot-ROM is provided with a conventional boot program, and the second boot-ROM with reprogrammed or updated boot programs. Provided is a select signal generator for producing select signals which designate one of said boot-ROMs and a boot-ROM select circuit for producing control signals that selectively activate one boot-ROM in response to the memory control signals fed from the CPU and one of said select signals. The select signal generator includes a first and second reset switches for producing a first and second chip select signals, each designating the first and second boot-ROMs. Also, those first chip select signal and second chip select signal can be produced in response to an input of a specific key combination from the keyboard and keyboard controller.

19 Claims, 7 Drawing Sheets

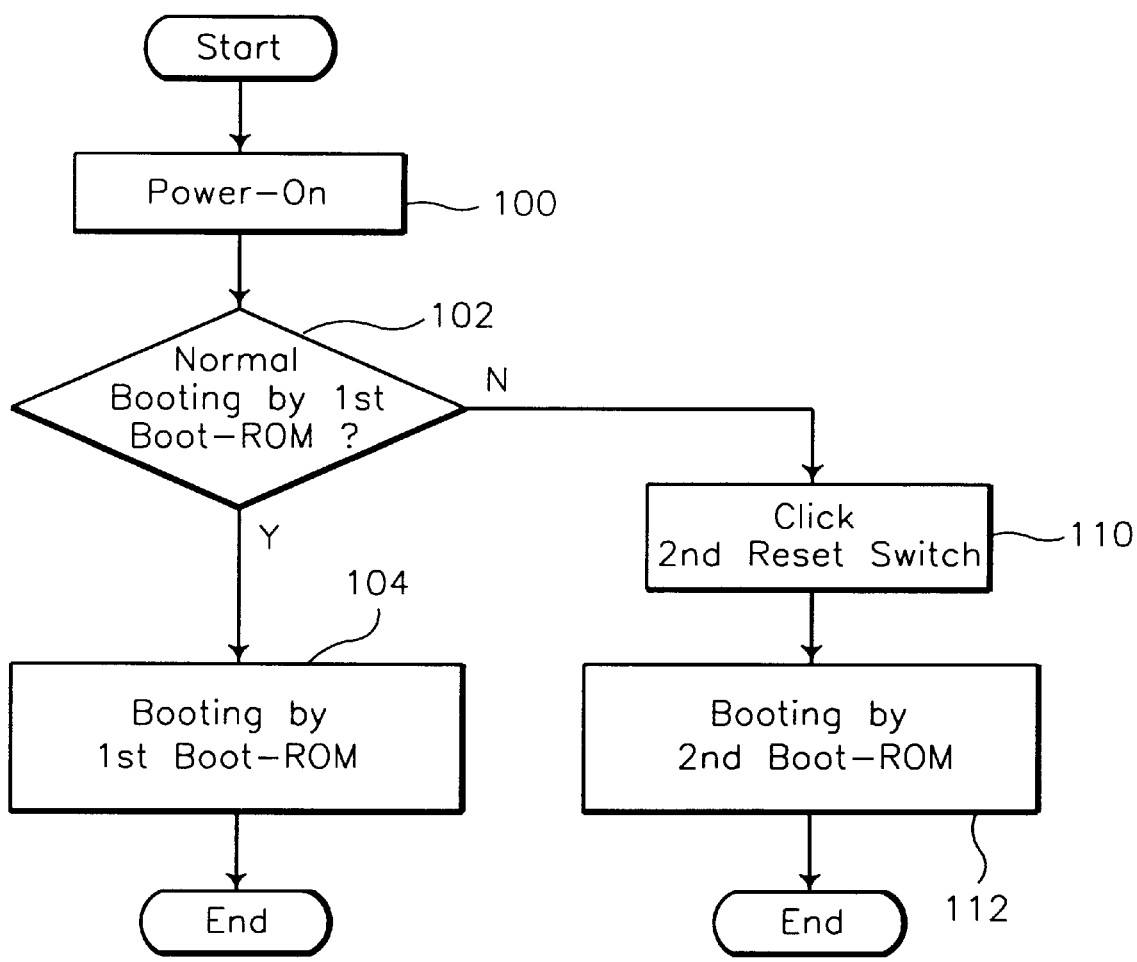

COMPUTER WITH MULTI BOOTING FUNCTION

CLAIM OF PRIORITY

This application makes reference to, incorporates the same herein, and claims all benefits accruing under 35 U.S.C. §119 from an application entitled *Computer With Multi Booting Function* earlier filed in the Korean Industrial Property Office on May 7, 1996, and there duly assigned Serial No. 1996-14793 by that Office.

BACKGROUND OF THE INVENTION

1. Field of the Invention

The present invention relates to computer system, and more particularly to a computer having multi booting function with at least two boot-ROMs having the same address space.

2. Discussion of Related Art

Typically, personal computers have a central processing unit (CPU), storage devices, and input/output devices, as core elements. Also, the storage devices may include a main memory, an auxiliary storage, and a boot-ROM. The boot-ROM stores basic input/output system (BIOS) and a boot-strap loader program executed at the system power-on or reset operation. See, for example U.S. Pat. No. 5,463,766 to Eric Schieve, et al. entitled *System And Method For Loading Diagnostics Routines From Disk*.

A basic organization of the above mentioned computer system utilizes a CPU connected with the input/output (I/O) devices and storage devices via a system bus. The storage devices may comprise a main memory, an auxiliary storage unit, and a boot-ROM. The CPU controls booting or rebooting of the computer according to a booting program stored in the boot-ROM or ROM-BIOS. Generally, the booting program performs initialization of components of the computer, self diagnostics or a Power-On Self-Test (POST) of the computer system, and reading out an operating system from the boot record of the auxiliary storage unit. Further, the boot-ROM uses an EPROM or an EEPROM device, and recently it tends to use a flash ROM for the convenience of reprogramming intended for functional addition or enhancement.

When the system is powered on and/or reset, the CPU executes booting programs stored in the boot-ROM. Then hardware components initialized and self diagnostics (POST) of the computer system is performed. A determination is then made regarding whether an error has occurred during the self diagnostics. If there is no error, it proceeds to start booting according to the operating system. If an error has occurred, it outputs an error message and ends the booting program.

The computer system having the above-mentioned boot-ROM has shortcomings, however, that the POST diagnostic is limited to the minimum test of the computer hardware due to the limited storage capacity of the ROM device. Thus, the booting program in the boot-ROM is insufficient for full testing of the components of the computer. On the other hand, increasing the capacity of the ROM and performing the full test result in a problem that prolongs booting period.

Further, for supplementing the POST, there may be provided another diagnostic program with the operating system such that it is executed when the booting by the operating system is performed. However, there is a precondition that the POST program is normally performed and the operating system is loaded in the main memory. That is, unstable hardware condition or programming error in the flash ROM prevent the operating system from loading into the computer system, and executing another diagnostic program in the operating system is not possible.

In order to avoid a not being able to use a computer due to a boot failure, U.S. Pat. No. 5,564,054 to Arnold H. Bramnick, et al. entitled *Fail-Safe Computer Boot Apparatus And Method* contemplates storing at least a minimal number of login files for minimal system configuration in order to boot a computer should an error occur while trying to boot the computer using the login files necessary for full system configuration. U.S. Pat. No. 5,388,267 to Wai-Ming R. Chan, et al. entitled *Method And Apparatus For Updating And Restoring System Bios Functions While Maintaining Bios Integrity* utilizes redundant boot memories, such as Flash EPROMs, and a user selectable hardware switch so that either boot memory can be selected to boot the computer. U.S. Pat. No. 5,432,927 to Jack A. Grote, et al. entitled *Fail-Safe EEPROM Based Rewritable Boot System* contemplates the use of a base flash boot memory and an auxiliary flash boot memory wherein both flash memories comprise the same address and necessary boot information, and are selectably enabled in response to a control signal decoded by an address decoder responsive to an address signal output from a central processing unit.

SUMMARY OF THE INVENTION

The present invention is intended to overcome the above described problem of the exemplary computer system having a flash ROM BIOS.

It is therefore an object of the present invention to provide a computer system with multi booting function which can selectively perform full diagnostics of the computer system without using a diagnostic program in an operating system.

It is another object of the present invention to provide a computer system with multi booting function that ensures safe operation of reprogrammed or updated booting programs stored in a flash ROM.

According to one embodiment of the present invention, there is provided dual boot-ROMs in a computer system in which the boot-ROMs have the same address space. Preferably, the first boot-ROM is provided with a general boot program, and the second boot-ROM with detailed diagnostic program. Alternatively, the first boot-ROM is provided with a conventional boot program, and the second boot-ROM with reprogrammed or updated boot programs.

Also, provided is a select signal generator for producing select signals which designate one of the boot-ROMs. The select signal generator includes a first reset switch for producing a first select signal which designates the first boot-ROM, and a second reset switch for producing a second select signal which designates the second boot-ROM. In addition, the select signal generator includes a keyboard having a plurality of keys and a keyboard controller for producing the first and second select signals in response to a key input of specific key combination, wherein the first and second select signal output terminal of the keyboard controller are commoned to the outputs of the first and second reset switches.

Further, there is provided a boot-ROM select circuit for producing control signals that selectively activate one boot-ROM in response to the memory control signals fed from the central processing unit (CPU) and one of the first and second select signals. The boot-ROM select circuit comprises a write enable signal generator for producing a first write enable signal in response to a write enable signal fed from the CPU and the first select signal, and for producing a second write enable signal and a second boot-ROM select signal in response to a write select signal fed from the CPU; and a chip select signal generator for producing a first and second chip select signals in response to a chip select signal fed from the CPU and one of the first and second select signals, and for producing the second chip select signal in response to the second boot-ROM select signal.

According to the present invention, safe booting of computer systems is possible such that if a boot-ROM is found defective, the other boot-ROM can be selected to perform normal booting process. If an error occurs during the normal booting process, detailed diagnostic program stored in the second boot-ROM can be executed by activating the second reset switch or pressing a is specific key combination. Further, the detailed diagnostic is executed prior to initiating the operating system. Thereby finding out a defect existed in the computer components is possible in a precise and easy manner.

BRIEF DESCRIPTION OF THE DRAWINGS

This invention may be understood and its objects, features, and advantages will become apparent to those skilled in the art by reference to the accompanying drawings as follows;

FIG. 8 is a flow chart illustrating booting process of the computer according to the present invention.

DETAILED DESCRIPTION OF PREFERRED EMBODIMENTS

Figure 1:
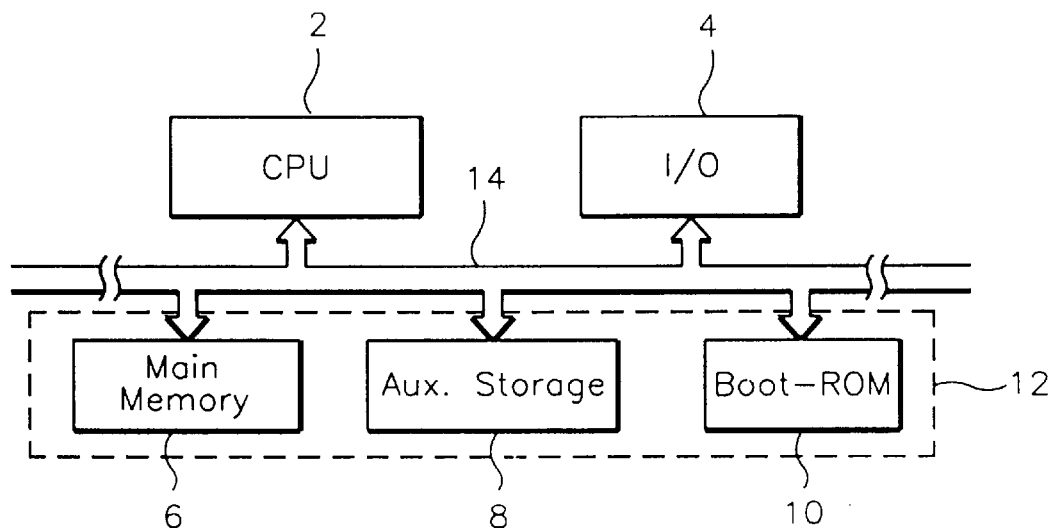
Fig. 1 is a block diagram for illustrating a exemplary computer having a boot-ROM.

FIG. 1 shows a basic organization of the above computer system. There, the CPU 2 is connected to the input/output devices 4 and the storage 12 via a system bus 14. Numerals 6, 8, and 10 denote the main memory, auxiliary storage, and the boot-ROM, respectively. The CPU 2 controls booting or rebooting of the computer according to the booting program stored in the boot-ROM or ROM-BIOS 10. Generally, the booting program performs initialization of components of the computer, self diagnostics or Power-On Self-Test (POST) of the computer system, and reading out an operating system from the boot record of auxiliary storage. Further, the boot-ROM 10 used an EPROM or an EEPROM device, and recently it tends to use a flash ROM for the convenience of re-programming intended for functional addition or enhancement.

Figure 2:
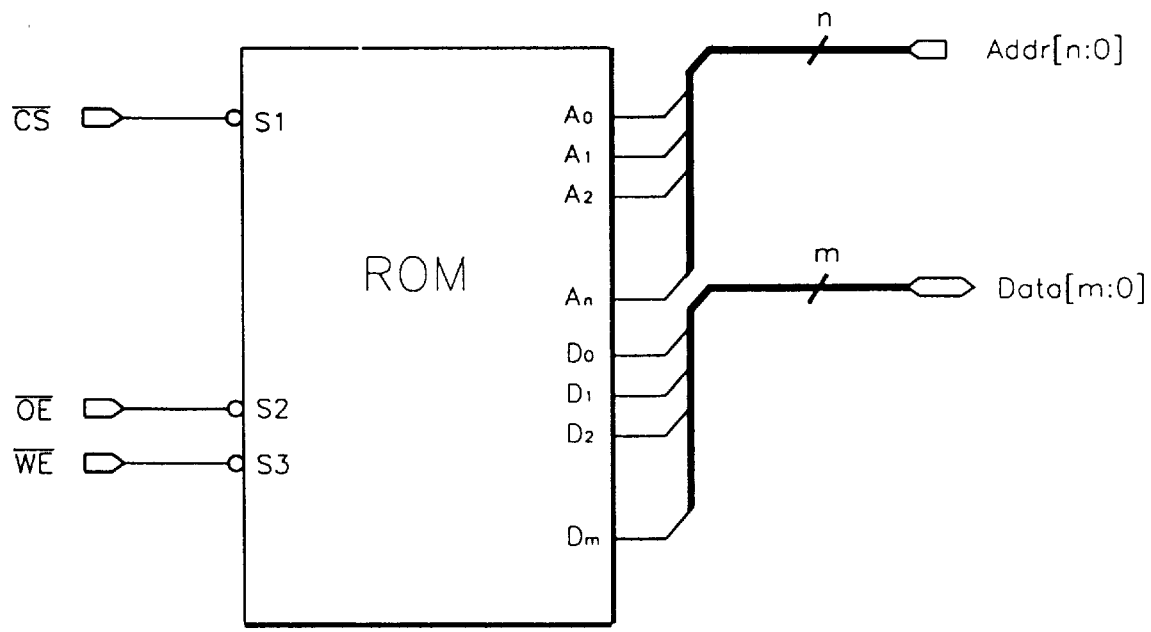
Fig. 2 is a schematic diagram showing basic input and output terminals and signal lines of a exemplary ROM.
Figure 3:
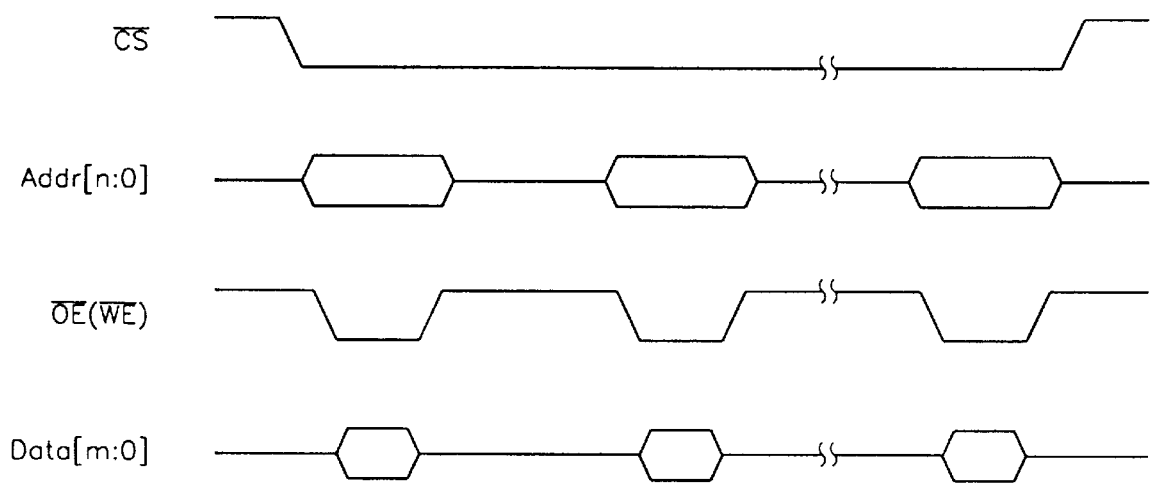
Fig. 3 is a timing chart showing operation of the ROM in FIG. 2.

A exemplary ROM is schematically shown in FIG. 2, and its operation is shown in FIG. 3. The ROM has addressing terminals $A_0$–$A_n$, data input/output terminals $D_0$–$D_m$, and a control signal input terminals S1–S3. Low level chip select signal $\overline{CS}$ is applied to the terminal S1 to activate ROM. To read memory, the CPU activates the address lines corresponding to the address code [n:0] of the wanted memory unit, and when low level out enable signal $\overline{OE}$ is applied to the terminal S2 the data stored in the memory location is outputted at the terminals $D_0$–$D_m$. To write memory, when low level write enable signal $\overline{WE}$ is applied to the terminal S3, the data [m:0] is inputted at the terminals $D_{0-Dm}$ and written in the assigned memory area.

Figure 4:
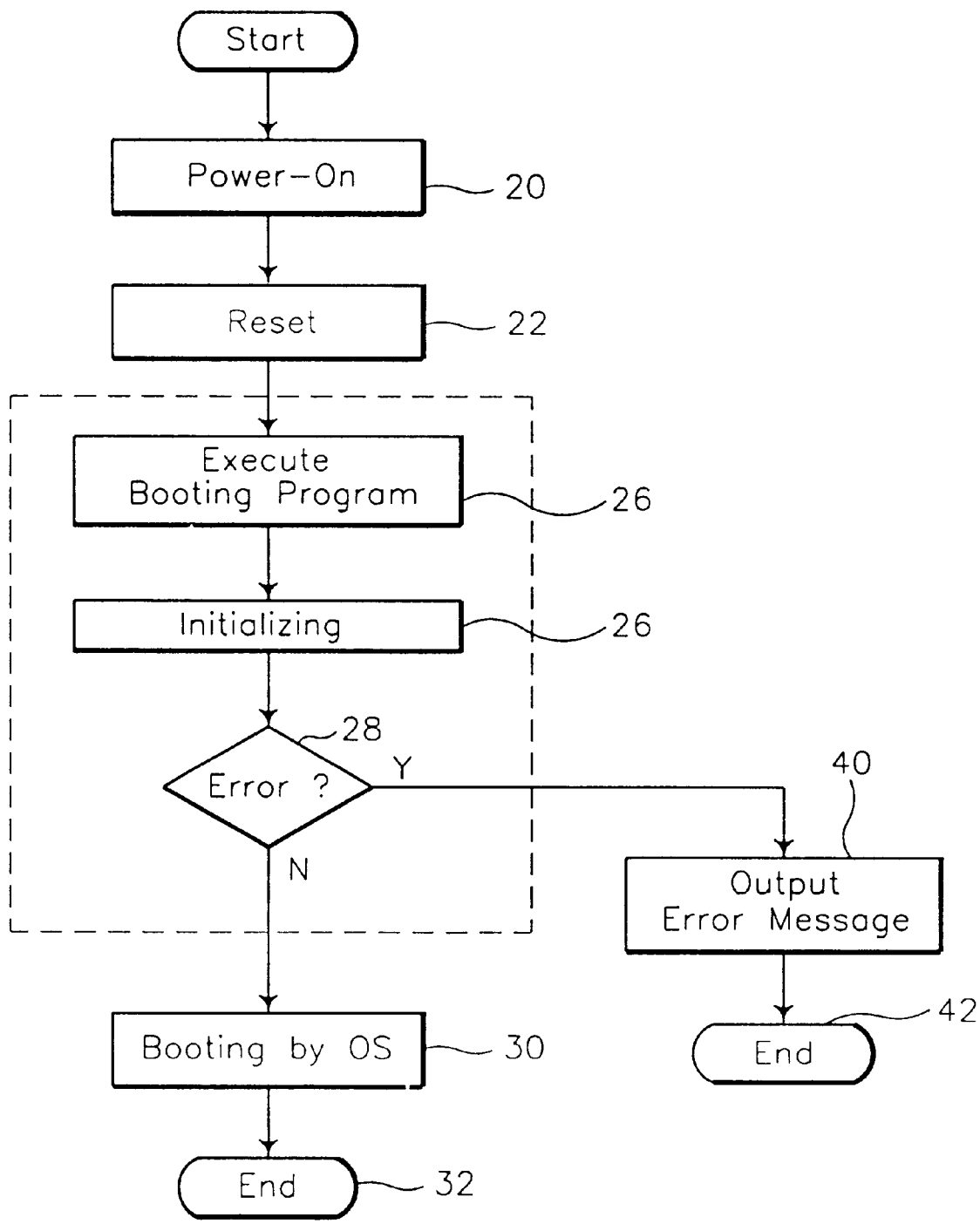
FIG. 4 is a flow chart illustrating booting process of a exemplary computer.

The booting procedure of the exemplary computer of FIG. 1 is fully described with reference to FIG. 4. Referring to the flow chart of FIG. 4, when the system is powered on and reset at step 20 and 22, the CPU 2 executes booting programs stored in the boot-ROM 10 at step 24. In sequence, initializing hardware components and self diagnostics (POST) of the computer system is performed in step 26. Determination is made at step 28 whether an error has occurred during the self diagnostics. If there is no error, it proceeds to step 30 to start booting by the operating system. If an error occurred at step 28, it outputs the error message at step 40 and ends the booting program.

Figure 5:
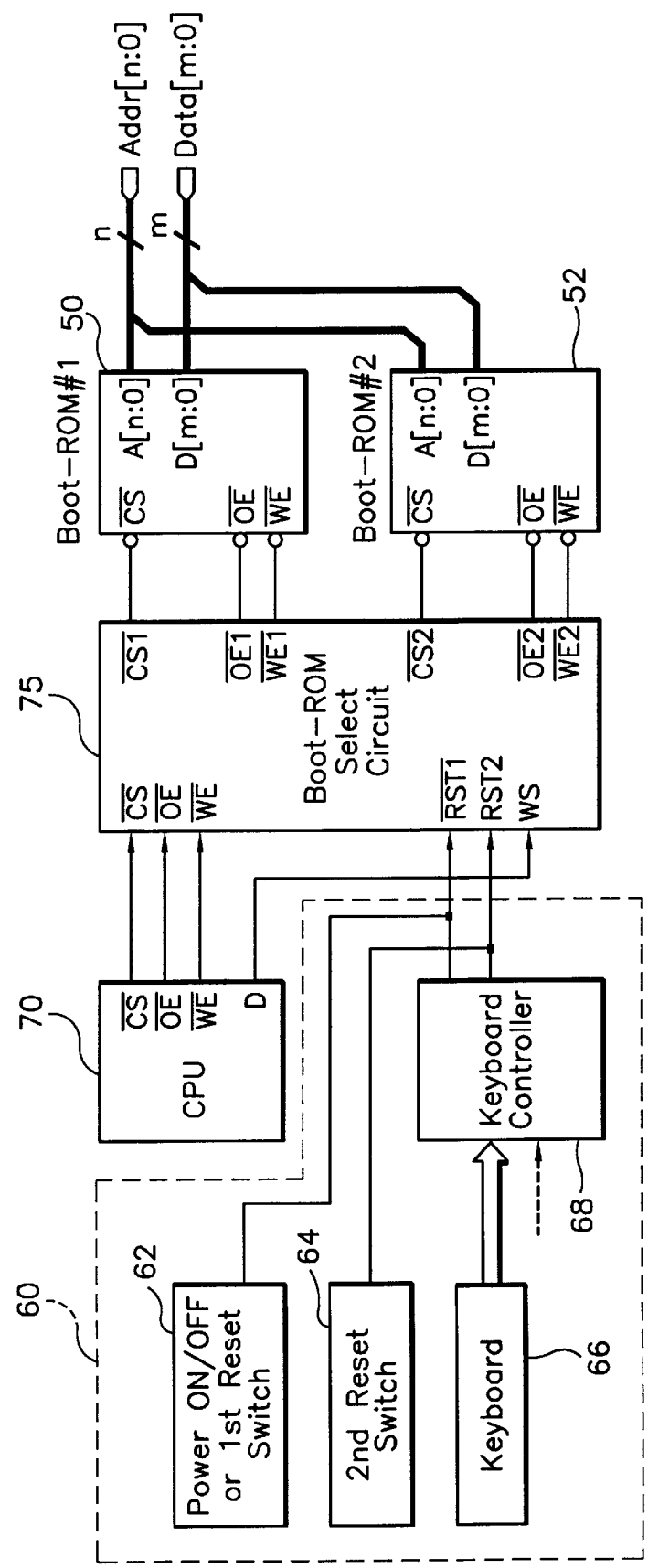
FIG. 5 is a block diagram illustrating system configuration of the computer having multi booting function according to the present invention.

FIG. 5 illustrates a computer system which has a multi booting function according to the present invention. The computer system comprises a first boot-ROM 50, a second boot-ROM 52, a select signal generator 60 for producing a select signal designating one of the first and second boot-ROMs 50, 52, a central processing unit (CPU) 70 for producing control signals for read/write operations of ROMs 50, 52, a boot-ROM select circuit 75 in response to the select signal fed from signal generator 60 and control signals produced at CPU 70 to activate one of the first and second boot-ROMs 50, 52 selectively.

Select signal generator 60 includes a power on/off switch or a first reset switch 62 producing a first select signal $\overline{RST1}$, a second reset switch 64 producing a second select signal RST2, a keyboard 66, and a keyboard controller 68. The outputs of each reset switch 62, 64 are commoned to the output of the keyboard controller 68.

Preferably, first and second boot-ROMs 50, 52 are each comprised of a flash RAM or flash EEPROM device and have the same address space.

In operation, when power switch or first reset switch 62 is manipulated, a low level first select signal $\overline{RST1}$ is produced. Also, responsive to manipulation of second reset switch 64, a high level second select signal RST2 is produced. Also, when a combination of specific keys in keyboard 66 (Ctrl, Alt, Del) are pressed, keyboard controller 68 produce first select signal $\overline{RST1}$. Also, responsive to pressing of another key combination (Ctrl, Alt, End) second select signal RST2 is produced.

In response to first select signal $\overline{RST1}$, boot-ROM select circuit 75 receives the chip select signal $\overline{CS}$ from CPU 70 and produces a first chip select signal $\overline{CS1}$ to be supplied to the is chip select signal input terminal $\overline{CS}$ of first boot-ROM 50. Thus, first boot-ROM 50 is activated. Subsequently, in responsive to write enable signal $\overline{WE}$ fed from CPU 70, boot-ROM select circuit 75 produces a first write enable signal $\overline{WE1}$ to be supplied to the input terminal $\overline{WE}$ of first boot-ROM 50.

Further, responsive to second select signal RST2, boot-ROM select circuit 75 produces a second chip select signal $\overline{CS2}$ to be supplied to the signal input terminal $\overline{CS}$ of second boot-ROM 52. Thus, second boot-ROM 52 is activated.

Meanwhile, when first and second boot-ROMs 50, 52 are not activated and CPU 70 produces output enable signal $\overline{OE}$, this signal is supplied to first and second boot-ROMs 50, 52 through boot-ROM select circuit 75, irrespective of whether first and second select signals $\overline{RST1}$, RST2 are input. Then, according to the logic value of chip select signal $\overline{CS}$ and whether first and second select signals $\overline{RST1}$, RST2 are input, the selected boot ROM outputs data (Data [m:0])in response to the addresses (Addr [n:0]) received.

Figure 6:
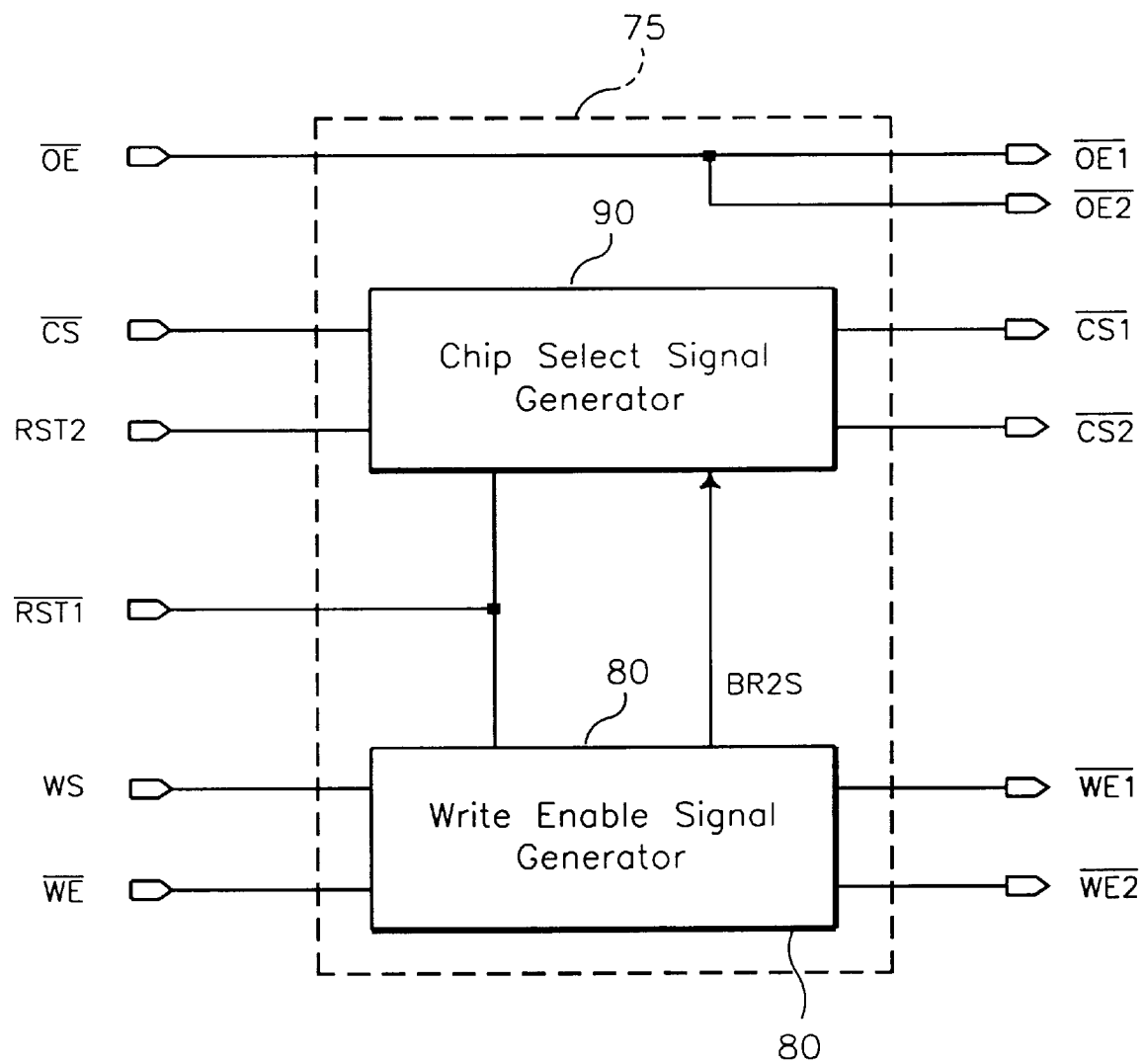
FIG. 6 is a block diagram of the boot-ROM select circuit shown in FIG. 5.
Figure 7:
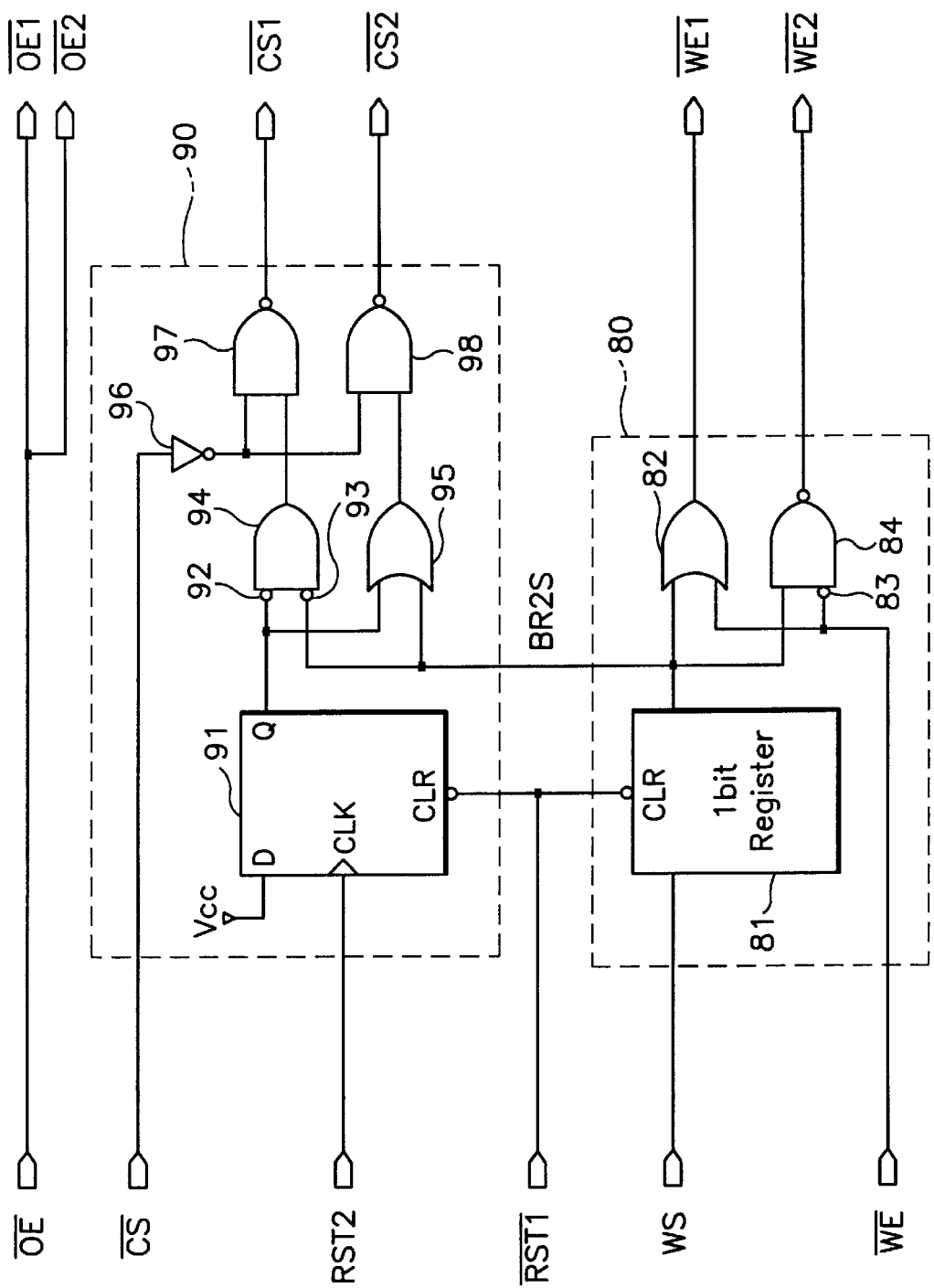
FIG. 7 is a detailed diagram of the boot-ROM select circuit shown in FIG. 6.

The configuration of boot-ROM select circuit 75 is shown in FIG. 6 and its detailed diagram is shown in FIG. 7. Boot-ROM select circuit 75 includes a chip select signal generator 90 producing one of the first and second chip select signals $\overline{CS1}$, $\overline{CS2}$ in response to the level of chip select signal $\overline{CS}$ fed from CPU 70 and one of the first and second select signals $\overline{RST1}$, RST2 fed from the first and second reset switches 62, 64. The signals $\overline{CS}$, $\overline{RST1}$, and RST2 are applied to the input terminals $\overline{CS}$, $\overline{RST1}$, and RST2 of boot-ROM select circuit 75.

Also, boot-ROM select circuit 75 includes a write enable signal generator 80 producing a first write enable signal $\overline{WE1}$, a second write enable signal $\overline{WE2}$ and a second boot-ROM select signal BR2S in response to the write enable signal $\overline{WE}$ and a write select signal WS fed from CPU 70, for enabling one of the first and second boot ROMs 50 and 52 to be written to for storing a boot program.

As indicated in FIG. 7, write enable signal generator 80 is comprised of a one-bit register 81 and a plurality of gates 82, 83, and 84. Also, chip select signal generator 90 includes a latch 91 and a plurality of gates 92–98. The one-bit register 81 has a predetermined address and stores one bit write select signal WS fed from CPU 70.

When first boot-ROM 50 is selected and activated, latch 91 and one-bit register 81 are cleared in response to first select signal $\overline{RST1}$ input at terminal $\overline{RST1}$. Then, each output of the latch 91 and one-bit register 81 produce a low level signal. In addition, the output of NAND gate 94 produces a high level signal, and the output of OR gate 95 produces a low level signal. Also, the output of NAND gate 97 produces the same signal level as that of the input chip select signal $\overline{CS}$, and the output of NAND gate 98 produces a high level signal irrespective of the signal level of chip select signal $\overline{CS}$. Further, the output of OR gate 82 produces the same signal level as that of the input write enable signal $\overline{WE}$, and the output of NAND gate 98 produces a high level signal irrespective of the input signal level of write enable signal $\overline{WE}$. With this, all access to the boot ROMs is made to first boot-ROM 50 and conventional booting can be performed by the first boot-ROM 50.

Further, second boot-ROM 52 is selected and activated when second select signal RST2 is applied to input terminal RST2 of boot-ROM select circuit 75. There, latch 91 produces a high level signal at its output Q in response to second select signal RST2 input at terminal RST2. Then, the output of NAND gate 94 produces a low level signal, and the output of OR gate 95 produces a high level signal. Thus, the output of NAND gate 98 produces the same signal level as that of chip select signal $\overline{CS}$, and the output of NAND gate 97 produces a high level signal irrespective of the signal level of chip select signal $\overline{CS}$. With this, read access to the boot ROMs is performed in second boot-ROM 52, and booting the computer system by the second boot-ROM 52 is possible.

In addition, when CPU 70 produces a write select signal WS supplied to one-bit register 81 of write enable signal generator 80, one-bit register 81 outputs a high level signal. Then, outputs of OR gate 82 and NAND gate 97 produce a high level signal, and outputs of NAND gate 98 and NAND gate 84 produce the signals correspond to chip select signal $\overline{CS}$ and write enable signal $\overline{WE}$, respectively. In other words, one-bit register 81 is an accessible register that can rewrite or change its output value by a software program. Thus, selective read/write operation for the desired boot-ROM between the first and second boot-ROMs 50, 52 is possible by a software program.

FIG. 8 illustrates a booting process of the computer system with multi booting function in accordance with the present invention. When the system is powered on at step 100, a general booting by way of the first boot-ROM is performed. This step includes initialization of components and self diagnostics of the computer system. During the booting process, a determination is made in step 102 whether normal booting by the first boot-ROM is performed. If there occurs no error, booting by the first boot-ROM is continued at step 104. However, if an error has occurred, it proceeds to step 110 to allow the operator to activate the second reset switch. Then, execution of a detailed diagnostic program stored in the second boot-ROM is carried out in step 112.

Also, the operator may activate the second reset switch during normal booting process to test an updated or reprogrammed booting programs stored in the second boot-ROM As apparent from the above description, the advantages of the present invention are as follows:

First, safe booting of computer systems is ensured such that if a boot-ROM is found defective, the other boot-ROM can be selected to perform normal booting process;

Selective full self diagnostic for the computer system is possible by the program stored in the additional boot-ROM, if necessary, during the normal booting process. Thus, preventing extension of normal booting period is possible. Also, full diagnostics of the computer system can be performed without using a diagnostic program in an operating system; and Testing of the update or reprogrammed boot program is possible if it is stored in a boot-ROM other than the exemplary ROM. During execution of the updated boot program, the integrity of the program can be determined and then the update program can be safely copied to the exemplary boot-ROM.

What is claimed is:

1. A computer having multi booting function comprising:

a first boot memory;

a second boot memory;

a select signal generator for generating one of a first chip select signal and a second chip select signal;

a central processing unit for producing a third chip select signal, a write select signal and one of an output enable signal and a write enable signal; and memory selection means responsive to said first chip select signal, said third chip select signal and said output enable signal for activating said first boot memory to perform a booting function of said computer, responsive to said second chip select signal, said third chip select signal and said output enable signal for activating said second boot memory to perform said booting function of said computer, responsive to said first chip select signal, said write select signal and said write enable signal for enabling a booting program to be stored in one of said first boot memory and said second boot memory.

2. The computer as set forth in claim 1, wherein said select signal generator comprises:

a first switch for generating said first chip select signal;

a second switch for generating said second chip select signal;

a keyboard having a plurality of keys; and a keyboard controller responsive to a first combination of said keys for generating said first chip select signal and responsive to a second combination of said keys for generating said second chip select signal.

3. The computer as set forth in claim 2, wherein said first boot memory is activated to boot said computer when said first switch is activated, and said second boot memory is activated to boot said computer in response to activation of said second switch when said first boot memory fails to boot said computer.

4. The computer as set forth in claim 1, wherein said memory selection means comprises:

a node connected to receive said output enable signal and to provide said output enable signal to said first and second boot memories;

a chip select signal generator responsive to said third chip select signal one of said first and second chip select signals for generating one of a fourth chip select signal and a fifth chip select signal for selecting one of said first and second boot memories, respectively; and a write enable generator responsive to said first chip select signal, said write select signal and said write enable signal for generating second and third write enable signals for enabling one of said first and second boot memories to be written to, and for generating a sixth chip select signal, said chip select signal generator being responsive to said third chip select signal, said sixth chip select signal and one of said first and second chip select signals for generating one of said fourth chip select signal and said fifth chip select signal for selecting one of said first and second boot memories during a write operation.

5. The computer as set forth in claim 4, wherein said chip select signal generator comprises:

a latch having a clock terminal for receiving said second chip select signal, a clear terminal for receiving said first chip select signal, a data terminal connected to a voltage source and an output terminal;

a first inverting gate connected to said output terminal of said latch;

a second inverting gate connected to receive said sixth chip select signal;

an AND gate having two input terminals respectively connected to output terminals of said first and second inverting gates;

an OR gate having a first input terminal connected to said output terminal of said latch and a second input terminal connected to receive said sixth chip select signal;

a third inverting gate connected to receive said third chip select signal;

a first NAND having a first input terminal connected to an output terminal of said third inverting gate, a second input terminal connected to an output terminal of said AND gate, and an output terminal for providing said fourth chip select signal to a chip select input terminal of said first boot memory; and a second NAND gate having a first input terminal connected to an output terminal of said third inverting gate, a second input terminal connected to an output terminal of said OR gate, and an output terminal for providing said fifth chip select signal to a chip select input terminal of said second boot memory.

6. The computer as set forth in claim 4, wherein said write enable signal generator comprises:

a one bit register having an input terminal for receiving said write select signal and a clear terminal for receiving said first chip select signal and an output terminal for providing said sixth chip select signal;

an OR gate having a first input terminal connected to said output terminal of said one bit register, a second input terminal for receiving said write enable signal from said central processing unit and an output terminal for providing said second write enable signal to a write enable terminal of said first boot memory;

an inverting gate connected to receive said write enable signal from said central processing unit; and a NAND gate having a first input terminal connected to said output terminal of said one bit register, a second input terminal connected to an output terminal of said inverting gate and an output terminal for providing said third write enable signal to a write enable terminal of said second boot memory.

7. The computer as set forth in claim 1, wherein said first boot memory and said second boot memory are commonly connected to an address bus.

8. The computer as set forth in claim 1, wherein said first boot memory and said second boot memory are each comprised of a non-volatile random access memory.

9. The computer as set forth in claim 1, wherein said first boot memory and said second boot memory are each comprised of a flash random access memory.

10. The computer as set forth in claim 1, wherein said first boot memory and said second boot memory are each comprised of a flash EEPROM.

11. A method for booting a computer having keyboard with a plurality of keys, a first boot memory and a second boot memory, said method comprising the steps of:

generating a first select signal by activating one of a first switch and a first predetermined combination of said keys;

generating a second select signal by activating one of a second switch and a second predetermined combination of said keys;

outputting from a central processing unit one or more of a chip select signal, an output enable signal, a write enable signal and a write select signal;

enabling a boot program to be stored in one of said first and second boot memories in response to said chip select signal, said write enable signal, said write select signal and one of said first and second select signals;

activating said first boot memory to boot said computer in response to said first select signal, said output enable signal and said first chip select signal;

determining whether said first boot memory performs a successful boot operation; and activating said second boot memory to boot said computer in response to said second select signal, said output enable signal and said chip select signal when it is determined that said first boot memory failed to perform said successful boot operation.

12. A computer having multi booting function comprising:

a first boot memory;

a second boot memory;

a select signal generator for generating one of a first select signal and a second select signal, said first select signal being generated in response to one of a powering up of said computer and a combination of a first plurality of keys attached to a keyboard of said computer and said second select signal being generated in response to one of a reset operation of said computer and a combination of a second plurality of keys attached to said keyboard of said computer;

a central processing unit for producing a chip select signal, a write select signal and one of an output enable signal and a write enable signal; and memory selection means responsive to said first select signal, said chip select signal and said output enable signal for activating said first boot memory to perform a booting function of said computer, responsive to said second select signal, said chip select signal and said output enable signal for activating said second boot memory to perform said booting function of said computer, responsive to said first select signal, said write select signal and said write enable signal for enabling a booting program to be stored in one of said first boot memory and said second boot memory.

13. The computer as set forth in claim 12, wherein said select signal generator comprises:

a power-on switch for generating said first select signal;

a reset switch for generating said second select signal; and a keyboard controller responsive to said combination of said first plurality of keys for generating said first select signal and responsive to said combination of said second plurality of keys for generating said second select signal, the outputs of the first select signals from said power-on switch and said keyboard controller being connected in common and the outputs of the second select signals from said reset switch and said keyboard controller being connected in common.

14. The computer as set forth in claim 13, wherein said memory selection means comprises:

a node connected to receive said output enable signal and to provide said output enable signal to each of said first and second boot memories;

a chip select signal generator responsive to said chip select signal, said first select signal and said second select signal for generating one of a first boot memory select signal and a second boot memory select signal for selecting one of said first and second boot memories, respectively; and a write enable generator responsive to said write select signal and said write enable signal for generating a first boot memory write enable signal and second boot memory write enable signal for respectfully enabling said first and second boot memories to be written to.

15. The computer as set forth in claim 14, wherein said write enable generator is responsive to said write select signal and said write enable signal for generating a second chip select signal, said chip select signal generator being responsive to said chip select signal produced by said central processing unit, said second chip select signal and one of said first and second select signals for generating one of said first boot memory select signal and said second boot memory select signal for selecting one of said first and second boot memories during a write operation.

16. The computer as set forth in claim 15, wherein said chip select signal generator comprises:

a latch having a clock terminal for receiving said second select signal, a clear terminal for receiving said first select signal, a data terminal connected to a voltage source and an output terminal;

a first inverting gate connected to said output terminal of said latch;

a second inverting gate connected to receive said second chip select signal;

an AND gate having two input terminals respectively connected to output terminals of said first and second inverting gates;

an OR gate having a first input terminal connected to said output terminal of said latch and a second input terminal connected to receive said second chip select signal;

a third inverting gate connected to receive said chip select signal produced by said central processing unit;

a first NAND having a first input terminal connected to an output terminal of said third inverting gate, a second input terminal connected to an output terminal of said AND gate, and an output terminal for providing said first boot memory select signal to a chip select input terminal of said first boot memory; and a second NAND gate having a first input terminal connected to an output terminal of said third inverting gate, a second input terminal connected to an output terminal of said OR gate, and an output terminal for providing said second boot memory select signal to a chip select input terminal of said second boot memory.

17. The computer as set forth in claim 16, wherein said write enable signal generator comprises:

a one bit register having an input terminal for receiving said write select signal, a clear input terminal for receiving said first select signal and an output terminal for outputting said second chip select signal;

a second OR gate having a first input terminal connected to said output terminal of said one bit register, a second input terminal for receiving said write enable signal produced by said central processing unit and an output terminal for providing said first boot memory write enable signal to a write enable terminal of said first boot memory;

an inverting gate connected to receive said write enable signal produced by said central processing unit; and a NAND gate having a first input terminal connected to said output terminal of said one bit register, a second input terminal connected to an output terminal of said inverting gate and an output terminal for providing said second boot memory write enable signal to a write enable terminal of said second boot memory.

18. The computer as set forth in claim 13, wherein said first boot memory and said second boot memory are each comprised of a flash EEPROM.

19. The computer as set forth in claim 13, wherein said first boot memory and said second boot memory are each comprised of a flash random access memory.

* * * * *